United States Patent [19]
Baker

[11] Patent Number: 5,774,245
[45] Date of Patent: Jun. 30, 1998

[54] OPTICAL CROSS-CONNECT MODULE

[75] Inventor: Phillip E. Baker, Tulsa, Okla.

[73] Assignee: WorldCom Network Services, Inc., Tulsa, Okla.

[21] Appl. No.: 675,225

[22] Filed: Jul. 8, 1996

[51] Int. Cl.[6] ............................................. H04J 14/02
[52] U.S. Cl. .................... 359/128; 359/110; 385/17
[58] Field of Search .................... 359/110, 114, 359/117, 127–128, 139, 165; 370/351; 385/16, 17

[56] References Cited

U.S. PATENT DOCUMENTS

| | | | |
|---|---|---|---|
| 5,181,134 | 1/1993 | Fatehi et al. | 359/117 |
| 5,452,124 | 9/1995 | Baker | 359/341 |
| 5,627,925 | 5/1997 | Alferness et al. | 385/17 |

Primary Examiner—Kinfe -Michael Negash
Attorney, Agent, or Firm—Arnold, White & Durkee

[57] ABSTRACT

An all optical cross-connect module is described that, in addition to routing optical signals, provides signal monitoring and signal path identification capabilities. In one embodiment, each bidirectional cross-connect module comprises two four-port wavelength division multiplexing (WDM) filters. One filter has a transmit-signal input (Tx-In) port, a transmit-signal (Tx-Out) output port, a transmit-monitor output (Tx-Mon-Out) port, and a path identification output (Path-ID-Out) port. The second filter has a receive-signal input (Rx-In) port, a receive-signal output (Rx-Out) port, a dual function path identification input/receive-signal monitor output (Path-ID-In/Rx-Mon-Out) port, and one port that is optically terminated to prevent signal reflections. Each of the two filters are designed to couple selected frequencies to the appropriate port. In alternative embodiments, a combination of standard couplers and three-port WDM filters are combined to provide substantially the same functionality.

51 Claims, 10 Drawing Sheets

Fig. 8

1310/670 nm, 2 CHANNEL, 4-PORT WDM FILTER

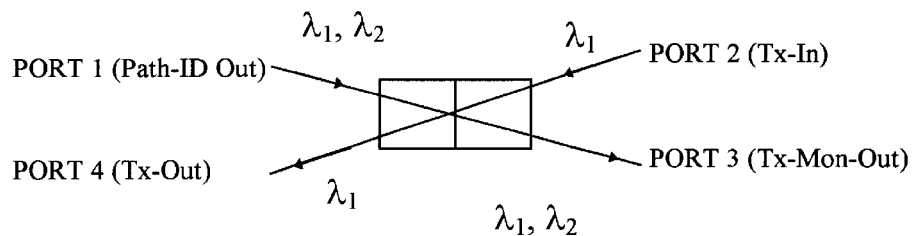

FILTER SPECIFICATIONS

| PARAMETER | TYPICAL | SPECIFICATION | UNITS |
|---|---|---|---|
| Wavelength $\lambda_1$ | | 1260-1360 | nm |
| Wavelength $\lambda_2$ | | 650-690 | nm |
| Loss @ $\lambda_1$: Port 2 → 4 and 2 → 3 | 3.0 | 2.8 - 3.2 | dB |
| Loss @ $\lambda_2$: Port 4 → 1 | 0.6 | < 0.8 | dB |
| Isolation @ $\lambda_1$: Port 4 → 1 | 3 | 2.8-3.2 | dB |
| Isolation @ $\lambda_2$: Port 4 → 2 | 35 | > 35 | dB |
| Return Loss @ all Ports | > 50 | > 45 | dB |
| Polarization Sensitivity | 0.01 | < 0.05 | dB |
| Polarization Dispersion | | < 0.1 | psec |
| Operating Temperature | | -20 to +70 | °C |
| Fiber Type | SMF 28 | 9/125/250 | µm |

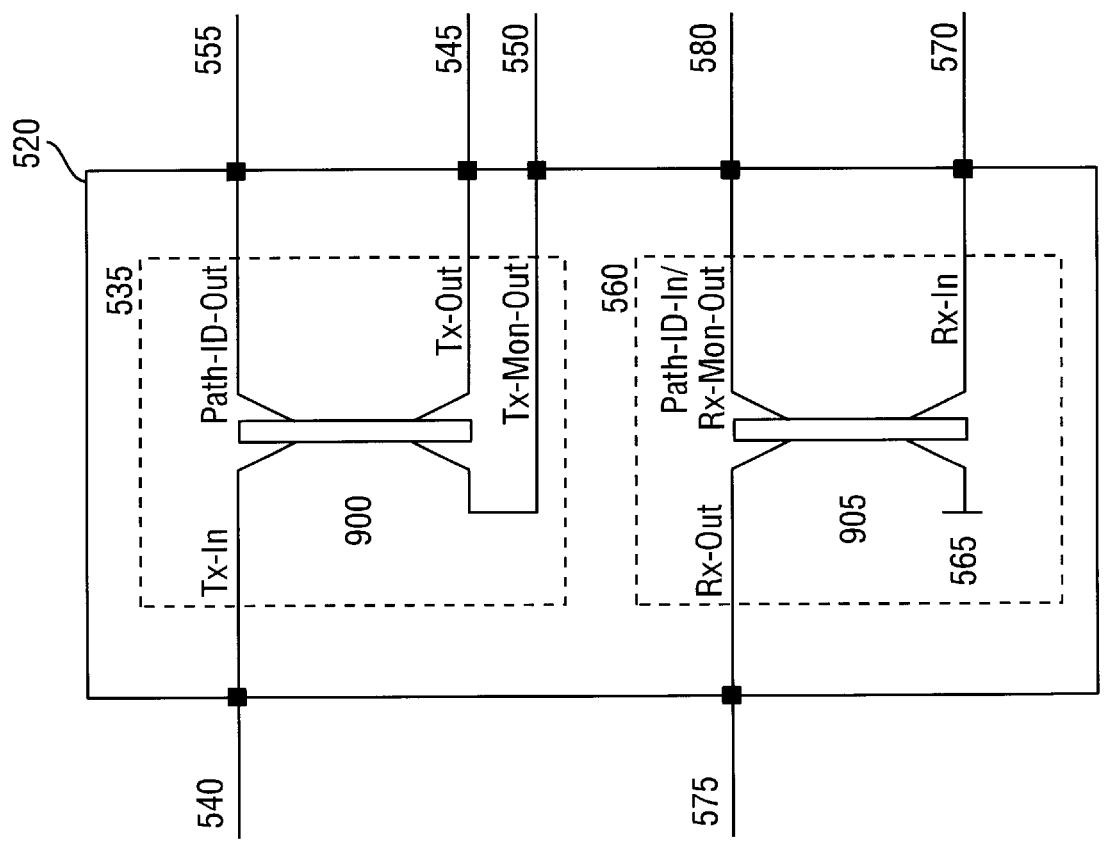

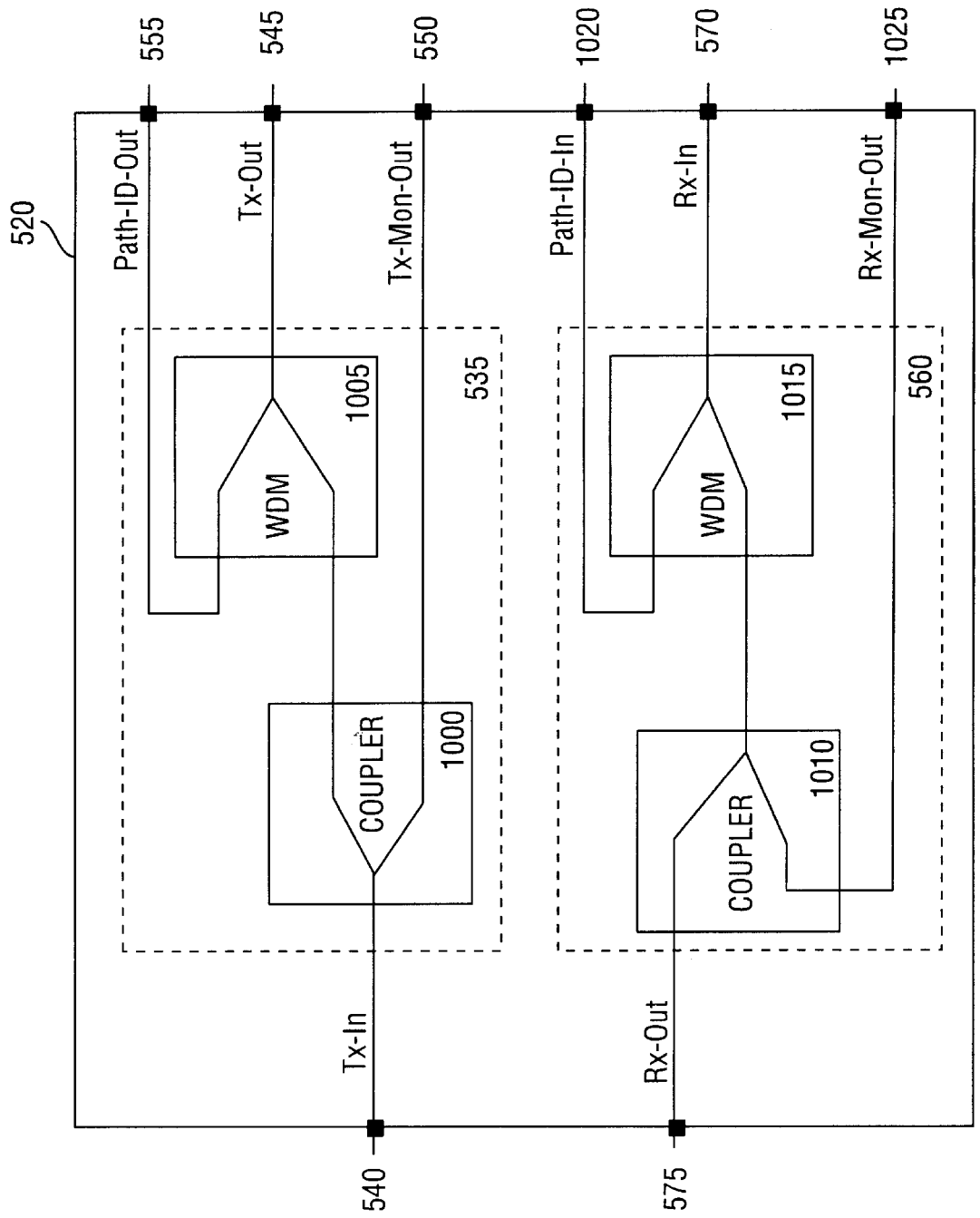

OPTICAL CROSS-CONNECT MODULE

1. REFERENCES

An optical cross-connect module in accordance with the invention can, in part or in whole, be implemented using four-port wavelength division multiplexing (WDM) filter technology. Various aspects of four-port WDM filter technology are described in commonly assigned U.S. Pat. No. 5,452,124 (issued on 19 Sep. 1995), which is hereby included in its entirety by reference.

2. BACKGROUND OF THE INVENTION

The invention relates in general to the field of optical communications and, more particularly, to an optical cross-connect module for interconnecting two optical circuits. Specifically, the invention is directed to an all optical cross-connect module that provides bidirectional optical signal routing, monitoring, and visual path identification capabilities.

FIG. 1 shows a conventional optical communications network 100 in which four cities (A 105, B 110, C 115, and D 120) are interconnected through an interconnection site 125 in a fifth city E 130. Optic fiber cable 135 connects cities A, B, C, and D to city E's interconnection site. Within the interconnection site 125, fiber optic transmission systems (FOTS) 140 provide an interface for signals to and from the fiber optic cables. Optical signals received from the outlying cities (A, B, C, and D) are routed via an interconnection means 145 for transmission over fiber optic cables to their destination.

During operation, two critical capabilities needed at the interconnection site 125 are monitoring and path identification. Monitoring refers to the ability to measure characteristics of a communication signal such as its power and waveform as it is transmitted through the site's equipment. Path identification refers to the ability to determine which cable connects, for example, a signal from the FOTS 140 connected to city A 105 to the FOTS 140 connected to city B 110.

The need for signal path identification is easy to understand for anyone who has had to maintain a large telecommunication central office (interconnection site 125). Trying to maintain several hundred to thousands of interconnections (typically via patch-cords) is a difficult task. For example, whenever a change to an existing routing setup is required, it is important to make sure both ends of the patch-cord used to connect the FOTS from one city to the FOTS of another city has been accurately identified. If improperly identified and disconnected, then service to an operating communications circuit is interrupted. (Some of the problems associated with circuit interruption can be ameliorated with 1+1 protection, an industry standard scheme of protection.) To minimize these types of errors, tracer light emitting diodes (LEDs) were introduced. By enabling the tracer function on one end of a cross-connect cable, an LED flashes on the other end of the cross-connect cable. This functionality requires power be supplied to all of the equipment used to implement the interconnection scheme.

Historically, telecommunications companies have operated with electrical DS3s as the lower data rate tributary off high-speed optical transmission systems, i.e., long-haul fiber transmission means such as inter-city fiber cables 135. See FIG. 2. A DS3 is an electrical 44.736 million bits-per-second (MBPS) data signal that is transmitted over (copper) coaxial cable. Working at the DS3 granularity, electrical DSX3 200 cross-connects provide a means of cross connecting signals from one city to another (within a common interconnection site 125) via jumper cables 205.

In DS3/DSX3 based systems, a monitoring capability is provided by electrical bridging circuitry. Path identification is provided via electrical tracer leads imbedded into the coaxial cross-connect cables 205 and red LED indicators. This, of course, requires each DS3/DSX3 element to be powered. In addition to the obvious requirement of having to run power cables to this equipment, fuse panels and grounding standards must also be enforced.

As the data rate of fiber optic transmission systems has increased, the number of DS3 tributaries that must be handled within a central office or interconnection site has also increased. Many modem central offices employ SONET OC-48 systems; each OC-48 system processes the equivalent of 48 DS3s. Use of OC-48 systems, however, has created the following problems in continuing to work at the DS3 granularity level:

1. The amount of floor space required to terminate and cross-connect DS3s has become unwieldy.
2. As central office or interconnection sites have expanded, the distance DS3 signals must travel has increased to the limit supported by conventional coax cables.
3. In many existing central offices, the amount, size, and weight of electrical coaxial cable required exceeds the space originally allocated to run these cables.
4. The time required to modify DS3 cross-connections in an emergency restoration environment has become unreasonably long.

To address these concerns, some telecommunication companies are migrating to an optical tributary as their primary intra-office granularity. The SONET OC-12 standard is the optical interface of choice for these companies. As shown in FIG. 3, an OC-12 based interconnection site 125 uses OC-12 equipment 300 to interface to the long-haul optic fiber cable 135. Fiber optic cables 305 connect the OC-12 equipment to fiber optic cross connect (FOX) modules 310. Fiber optic patch cables 315 are used to route signals between the different FOX units.

An OC-12 is the equivalent of twelve DS3 circuits and operates at approximately 560 MBPS. SONET OC-12 tributaries offer the following advantages over DS3s:

1. Savings in the cost of equipment deployed.
2. The SONET standard specifies that OC-12s be 1+1 protected, this equates to full fault tolerance at the OC-12 level in the case of equipment failures or human error during operation.
3. Optical OC-12 systems can span greater distances than electrical DS3 circuits.
4. The density of OC-12 systems over DS3 based systems is significant in not only circuit capacity but in the physical size and weight of optical jumpers versus coaxial cable.
5. Optical fiber interconnects are inherently immune to electromagnetic interference (DS3 based systems are not).

To exploit these, and other benefits in an all optical cross-connect system, the key capabilities of optical signal monitoring and path identification must be implemented. An all optical cross-connect module in accordance with the invention addresses these needs.

3. SUMMARY OF THE INVENTION

As shown in FIG. 4, an all optical (electrically passive) bidirectional cross-connect module 400 in accordance with the invention is described that, in addition to routing optical signals, provides signal monitoring and signal path identification capabilities. In one embodiment, each cross-connect module 400 comprises two four-port wavelength division multiplexing (WDM) filters. The first filter 405 has a transmit-signal input (Tx-In) port 410, a transmit-signal output (Tx-Out) port 415, a transmit-signal monitor output (Tx-Mon-Out) port 420, and a path identification output (Path-ID-Out) port 425. The second filter 430 has a receive-signal input (Rx-In) port 435, a receive-signal output (Rx-Out) port 440, a dual function path identification input/ receive-signal monitor output (Path-ID-In/Rx-Mon-Out) port 445, and one port 450 that is optically terminated to prevent signal reflections. In one embodiment, both the first and second filter are implemented using fused biconic taper (FBT) technology.

The first filter 405 is designed to couple an optical signal having a first wavelength, typically in the 1310 or 1550 nanometer (nm) transmission window, from the Tx-In port 410 to both the Tx-Out port 415 and the Tx-Mon-Out port 420. The first filter 405 is also designed to couple substantially all of an optical signal having a second wavelength, typically between 400 and 700 nm, from the Tx-Out port 415 to the Path-ID-Out port 425. The second filter 430 is designed to couple an optical signal having a third wavelength, typically in the 1310 or 1550 nm transmission window, from the Rx-In port 435 to both the Rx-Out port 440 and the Path-ID-In/Rx-Mon-Out port 445. The second filter 430 is also designed to couple substantially all of an optical signal having a fourth wavelength, typically between 400 and 700 nm, from the Path-ID-In/Rx-Mon-Out port 445 to the Rx-In port 435.

An optical signal passing through the interconnect module 400 may be monitored by attaching conventional signal measuring equipment to the module's Tx-Mon-Out port 420 or the Path-ID-In/Rx-Mon-Out port 445.

Optical path identification is provided by injecting an optical path identification signal into the second filter's Path-ID-In/Rx-Mon-Out port 445. Through patch cords, connected to a second cross-connect module (not shown in FIG. 4). The optical path identification signal will appear at the Path-ID-Out port 425 of the cross-connect module which is physically connected via the cross-connect jumper to the module in which the path identification signal was injected. If the injected optical path signal has a wavelength in the human visual spectrum (approximately 400 to 700 nm), then visual path identification is provided.

Alternative embodiments of the inventive cross-connect module may use thin film interference filters in place of FBT filters. Another embodiment replaces the four-port filters described above with a combination of optical couplers and conventional three-port wavelength division multiplexer (WDM) filters.

Some of the benefits provided by an optical cross-connect module in accordance with the invention are: (1) it is completely passive and, therefore, does not require any external power; (2) provides complete signal monitoring and path identification capabilities in an optical environment; (3) is capable of providing dramatically improved reliability over conventional hybrid electrical-optical cross-connect systems; and (4) makes a complete cross-connection site more cost effective to operate due to reduced power costs.

4. BRIEF DESCRIPTION OF DRAWINGS

FIG. 8 shows an illustrative specification for a four-port filter in accordance with the invention.

FIG. 9 illustrates an embodiment of the inventive cross-connect module that uses thin film type WDM filter technology.

FIG. 10 illustrates an embodiment of the inventive cross-connect module that using a combination of conventional optical couplers and three-port WDM filter technology.

5. DETAILED DESCRIPTION OF A SPECIFIC EMBODIMENT

For purposes of illustration, several specific embodiments of the invention are described below. One description is organized as a claim-like list of features, annotated with explanatory notes. Bracketed numbers, in the claim-like list of features, are references to explanatory notes which follow the list. Additional discussion is set out thereafter. It is emphasized, however, that the invention for which patent protection is sought is defined in the claims at the end of this specification. Any correlation between the claims at the end of the specification and the claim-like list of features is for purposes of illustration only and is not to be construed as limiting the claims at the end of the specification.

It will be appreciated that in the development of any actual implementation (as in any engineering development project), numerous implementation-specific decisions must be made to achieve the developers' specific goals, and that these goals may vary from one implementation to another. Moreover, it will be understand that such a development effort might be complex and time-consuming, but would nevertheless be a routine undertaking for an optical communication's system's design engineer of ordinary skill having the benefit of this disclosure.

5.1. Introduction

Figure 1:
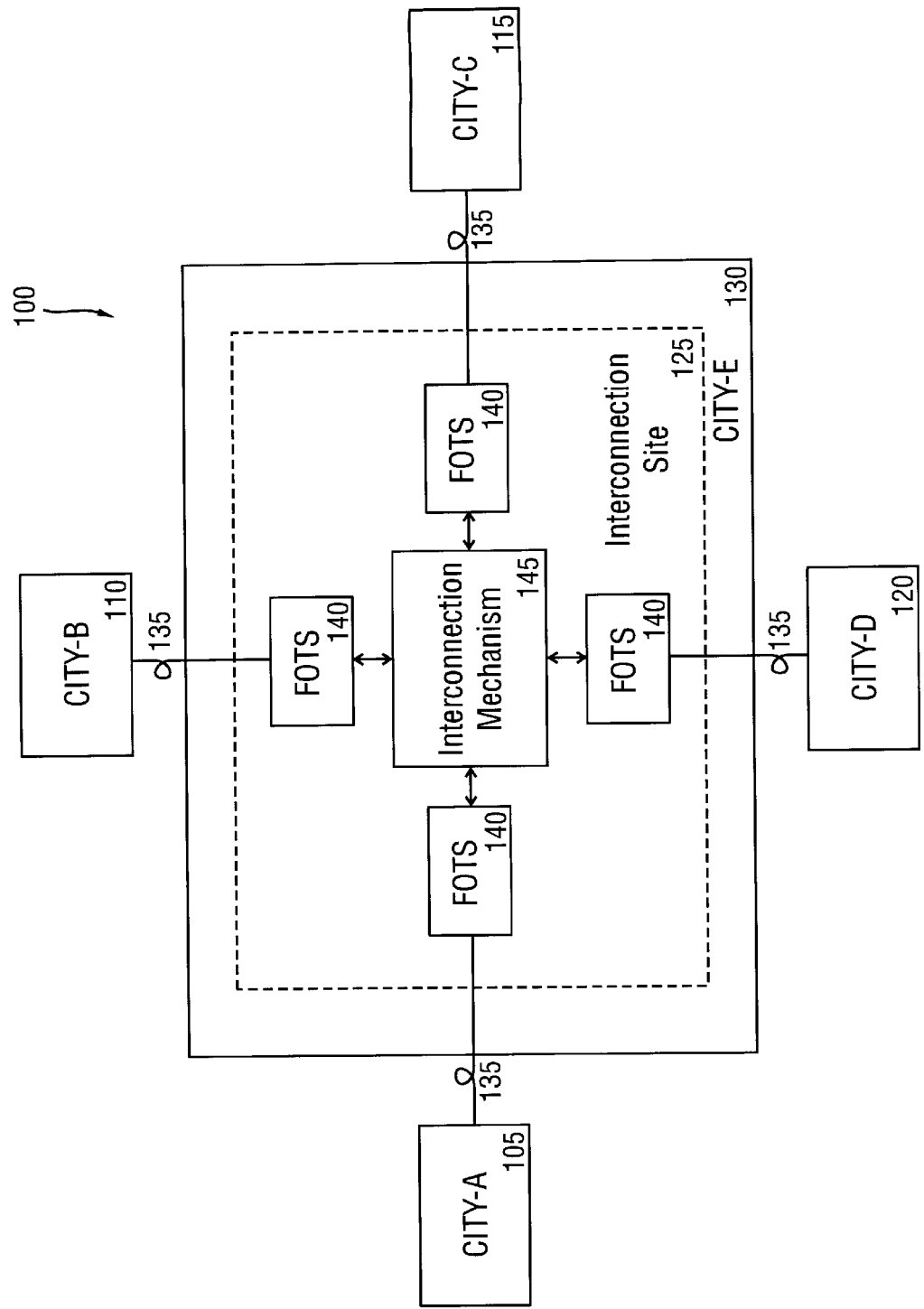
FIG. 1 represents an illustrative optical communications system.
Figure 2:
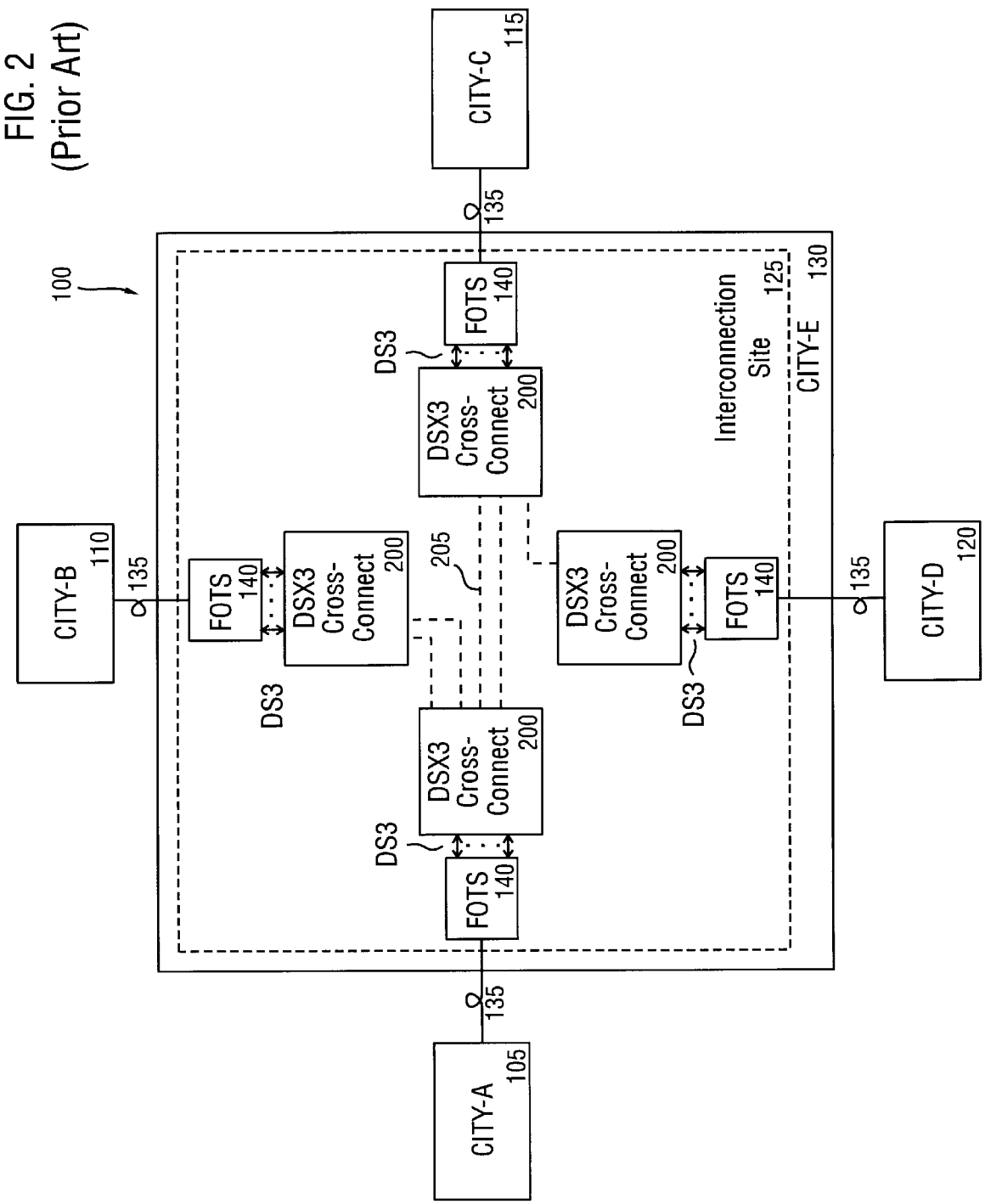
FIG. 2 shows a prior art optical communications system having a conventional DS3 based interconnection site.
Figure 3:
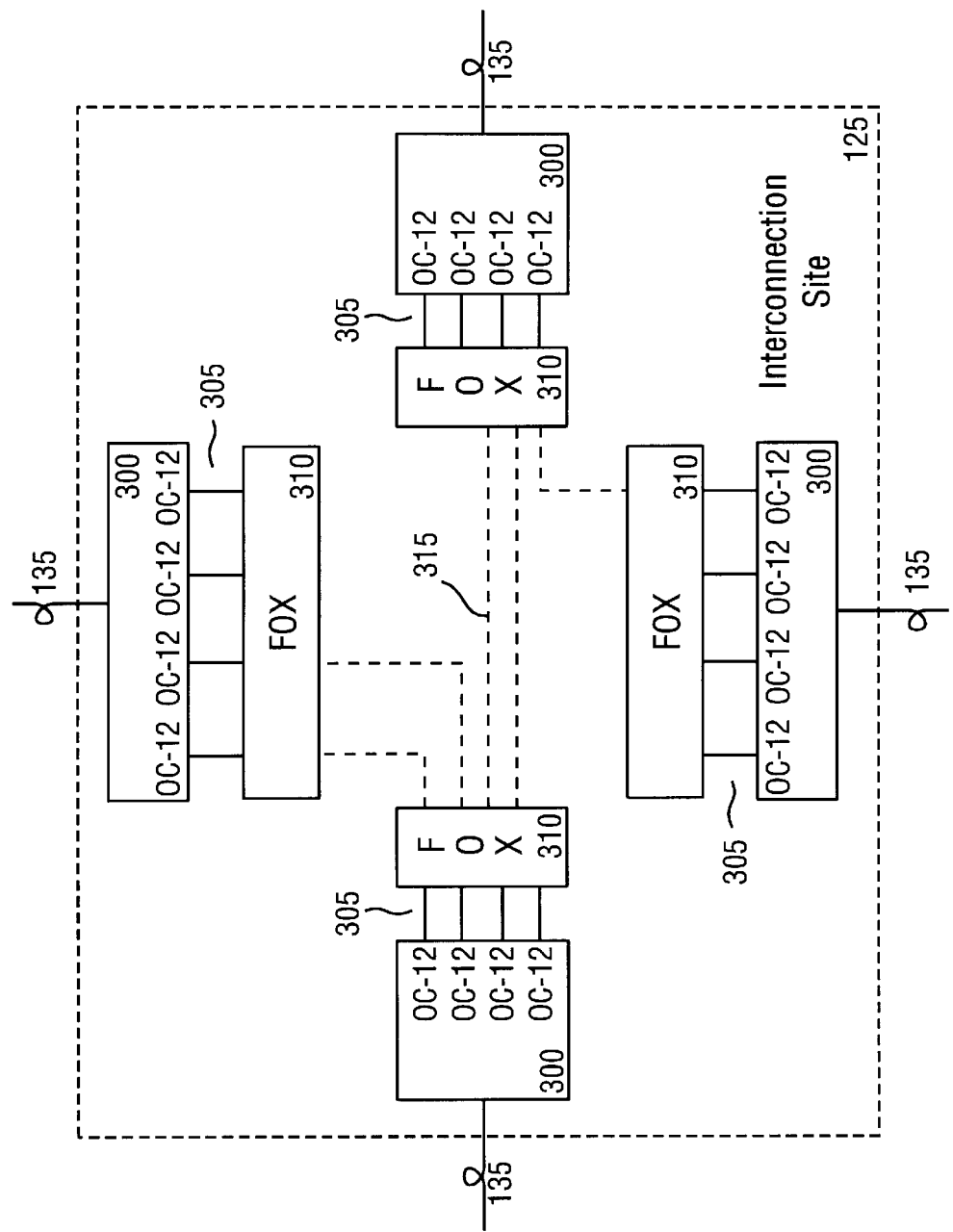
FIG. 3 illustrates a prior art optical communications interconnection site employing OC-12 technology.
Figure 4:
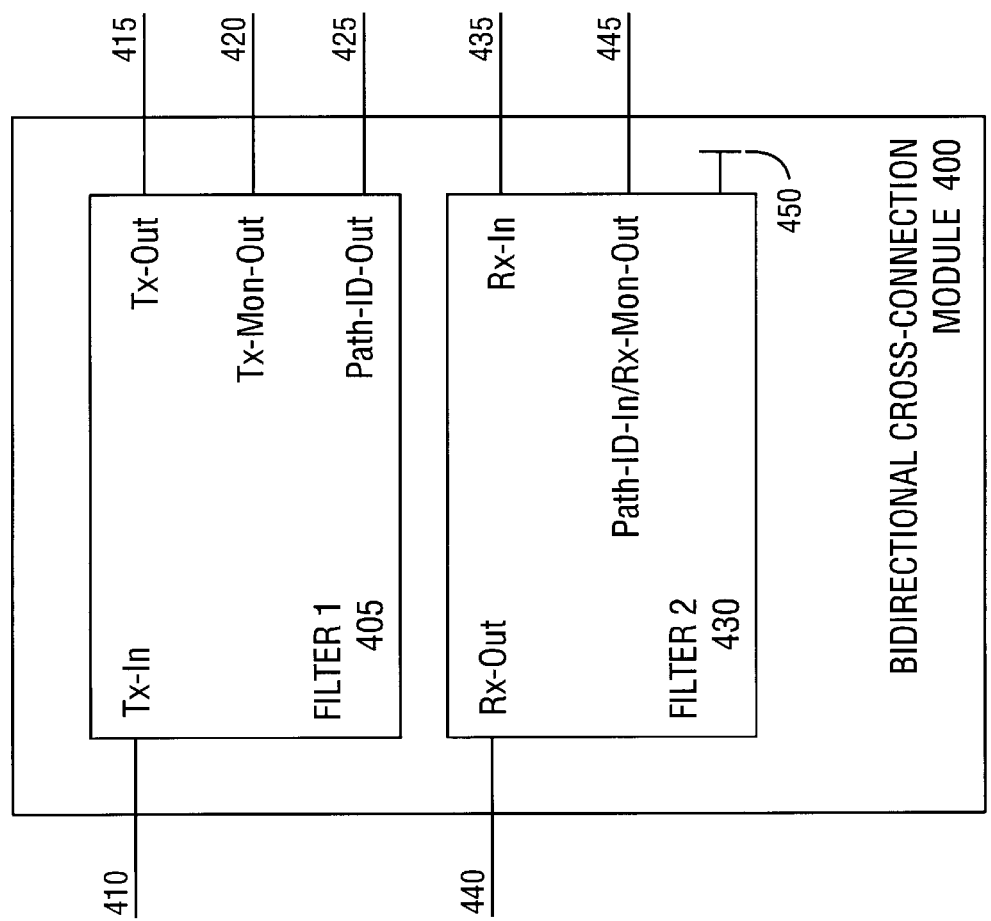
FIG. 4 is a block diagram of a bidirectional optical cross-connect module in accordance with the invention.
Figure 5:
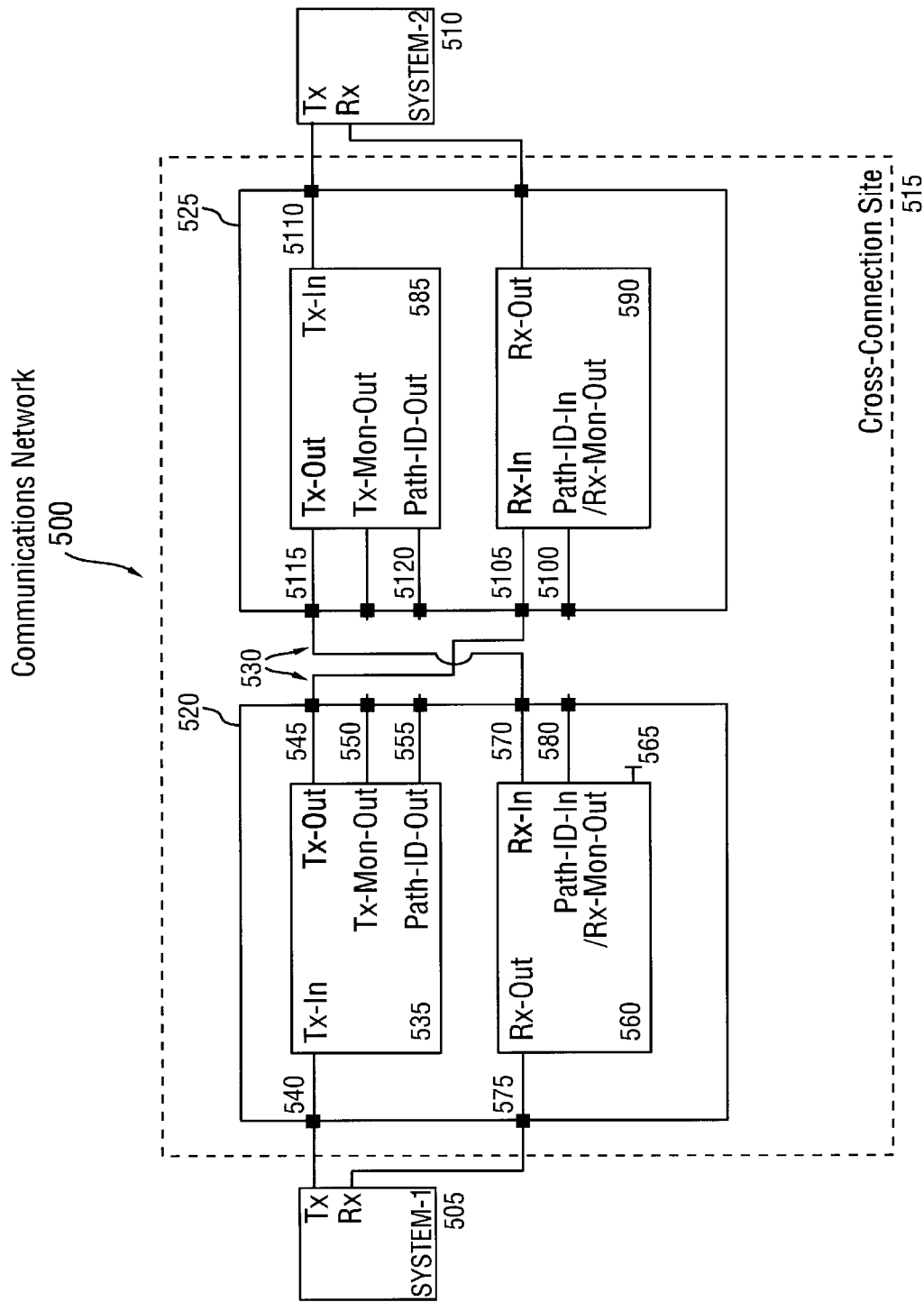
FIG. 5 illustrates an optical communications system whose cross-connect site employs an optical cross-connect module in accordance with the invention.

See FIG. 4 for a block diagram of an illustrative bidirectional cross-connect module in accordance with the invention. Using a plurality of optical cross-connect modules in accordance with the invention allows the implementation of a totally optical, and therefore electrically passive, optical switching or cross-connection site, also referred to as a central office. FIG. 5 depicts such an illustrative communications network 500. As shown, both system-1 505 and system-2 510 have optical transmit and receive capability. Typically, system-1 505, system-2 510, and cross-connect site 515 may all be centrally located. Alternatively, optical cross-connects allow systems 505 and 510 to be located in sites farther apart than is possible if conventional electrical cabeling is employed.

Each cross-connect site 515 comprises a first cross-connect module 520 for the connection of optical signals to/from system-1 505 and a second cross-connect module 525 for the connection of optical signals to/from system-2 510. The first and second cross-connect modules are operationally the same. Optical fiber jumper's 530 are used to interconnect the first optical cross-connect module 520 with the second optical cross-connect module 525. In one embodiment, the optical fiber jumper 530 is a dual fiber jumper. In this manner, the cross-connect site 515 can be used to dynamically route signals from one system (system-1 505) to another system (system-2 510) without the need to change anything but short patch cable's 530. (It is noted that there may, in an actual communication's network, be more than two sites that are interconnected at a single cross-connect site 515. For simplicity, only two are shown in FIG. 5.)

Current optical communication systems typically use the 1550 nm (nanometer) and the 1310 nm spectral windows for the transmission of signals. By convention, the 1550 nm window comprises those wavelengths between approximately 1525 nm and 1575 nm. Similarly, the 1310 nm transmission window comprises those wavelengths between approximately 1290 nm and 1330 nm. The use of these particular transmission wavelengths implies that the communication network's optical transmitters, receivers, cross-connect modules, and other support devices are optimized for single-mode operation.

5.2. An Illustrative Optical Cross-connect Module

An optical cross-connect module 520 (or, alternatively, module 525) in accordance with the invention comprises:

(a) a first filter 535 [1] having
   (1) a transmit-signal input (Tx-In) port 540 [2],
   (2) a transmit-signal output (Tx-Out) port 545 [3],
   (3) a transmit-signal monitor output (Tx-Mon-Out) port 550 [4],
   (4) a path identification output (Path-ID-Out) port 555 [5],
   (5) wherein the Tx-In port 540 is optically coupled to both the Tx-Out port 545 and the Tx-Mon-Out port 550 [6], and
   (6) wherein said Tx-Out port 545 is optically coupled to both the Path-ID-Out port 555 and the Tx-In port 540 [7]; and (b) a second filter 560 [8] having
   (1) a receive-signal input (Rx-In) port 570 [9],
   (2) a receive-signal output (Rx-Out) port 575 [10],
   (3) a path identification input/receive-signal monitor output (Path-ID-In/Rx-Mon-Out) port 580 [11], and
   (4) wherein said Rx-In port 570 is optically coupled to both the Rx-Out port 575 and the Path-ID-In/Rx-Mon-Out port 580 [12], [13]

Notes

[1] In the current context the term "filter" is intended to mean a frequency sensitive device that routes/couples optical signals from one point to another. Those skilled in the art will recognize that two common types of devices used to split and/or route optical signals are the coupler and the filter. The term coupler is generally restricted to wavelength independent splitting devices, while the term filter is generally associated with frequency selective multiplexing devices.

One type of filter useful in an optical cross-connect module is a wavelength division multiplexer (WDM) filter. A WDM filter is a device that combines and/or extracts multiple wavelengths. For instance, a conventional three-port WDM designed to band-pass signals in the 1550 nm window will pass those wavelengths between approximately 1525 nm and 1575 nm from the filter's input (first) port to its output (second) port, without substantial alteration. Those signals arriving at the filter's input port that are not within its pass band are reflected or routed to the filter's reflection (third) port.

Conventional techniques to implement WDM filters include thin film and fused biconic taper (FBT) technologies. JDS/Fitel and OCA are two companies with expertise in thin film technology for the design of WDM filters. ADC Telecommunicaitons and Amphenol are two companies with expertise in FBT filter technologies. (As would be known to those of ordinary skill in the art, a combination of one or more couplers and one or more filters may be combined to provide the functionality of "a first filter 535," see discussion below.)

In a typical FBT filter, two single mode optical fiber cores (optical fibers without cladding) are brought into close proximity, twisted, heated, and drawn so that electromagnetic fields from one fiber can cross-couple into the second fiber. It is well known in the art that for a given wavelength, a specific draw length is required to obtain a desired coupling ratio; the fraction of an optical signal's power being transmitted on one of the two fibers that is coupled into the second fiber. If a FBT filter is to be used as a WDM filter, then a draw length must be chosen to provide the desired splitting ratios for the different wavelengths used (typically two). Those of ordinary skill in the art will recognize that there are some combination of wavelengths and splitting ratio's that can not be designed for with current technology.

[2] An input signal, referred to as the transmit-signal, from system-1 505 is received by the cross-connect module 520 at this port.

[3] A portion of the transmit-signal received by cross-connect module 520 at its Tx-In port 540 is coupled to this port. See the discussion below for further details.

[4] A portion of system-1's 505 transmit-signal, received by cross-connect module 520 at its Tx-In port 540, is coupled to this port. The Tx-Mon-Out port 550 provides a convenient location for measuring/monitoring transmit-signal characteristics such as its waveform and power. See the discussion below for further details.

[5] The Path-ID-Out port 555 provides a convenient location for detecting whether two optical cross-connect modules are, in fact, interconnected. As described above, path-identification is a means to verify that two cross-connect modules (e.g., 520 and 525) cross-connect a common signal. To determine which two cross-connect modules are interconnected, a light source is used to inject an optical signal into one cross-connect module which is subsequently detected at this port. See the discussion below for further details.

To provide "visual" path identification, a light source must be selected that falls within the visual spectrum of the human eye; between approximately 400 nm and 700 nm. Wavelengths in the 670 nm range, corresponding to a bright red color, are particularly easy to see. An added benefit to this wavelength is that there are commercially available solid state lasers that operate at this wavelength. Noyes Fiber Systems and EXFO Electro-Optical Engineering are two manufacturers that offer visual light sources that fit this description.

[6] For purposes of discussion, let system-1 505 transmit on a first wavelength $\lambda_1$ (e.g., a wavelength in the 1550 nm or 1310 nm windows); the signal arriving at the cross-connect module's 520 Tx-In port 540. See FIG. 6. In one embodiment, coupling from the Tx-In port 540 to the Tx-Out port 545 and the Tx-Mon-Out port 550 is effected by a four-port FBT filter. The FBT filter is designed to split the incoming transmit-signal (having a wavelength $\lambda_1$) so that a portion of the signal's power is routed to the Tx-Out port 545 and the remainder of the signal's power is routed to the Tx-Mon-Out port 550.

For monitoring purposes, any splitting ratio may be selected. For example, a 50/50, 90/10, or 75/25 splitting ratio can be used. The choice of a 50/50 ratio is advantageous because it allows a technician maintaining a system to determine the transmit-signal's power directly by measuring the signal strength at the Tx-Mon-Out port 550; a 50/50 split ensures that the incoming transmit-signal's power is evenly divided between the Tx-Out port 545 and the Tx-Mon-Out port 550. Any other splitting ratio requires a calculation to adjust the measured signal power to compensate for the splitting ratio of the filter 535.

One reason an unequal splitting ratio may be used, however, is if the optical circuit between first and second cross-connect modules 520 and 525 could not support the extra insertion loss of a 50/50 splitting ratio. It is noted, however, that the close proximity of intra-office optical systems (i.e., within the cross-connect site 515) often requires that incoming optical signals be attenuated so that they do not saturate detection circuitry in the receiver. In these situations, the extra attenuation of a 50/50 splitter may be a benefit by eliminating the additional hardware needed to attenuate the signals.

[7] For purposes of discussion, let an optical source having a wavelength $\lambda_2$ generate a path identification signal. When the path identification signal is injected (by a technician) into a second cross-connect module it is coupled by that module's filter and routed, via patch cables, to a first cross-connect module. The path identification signal may then be monitored/detected at 9 the first cross-connect module's Path-ID-Out port.

Figure 6:
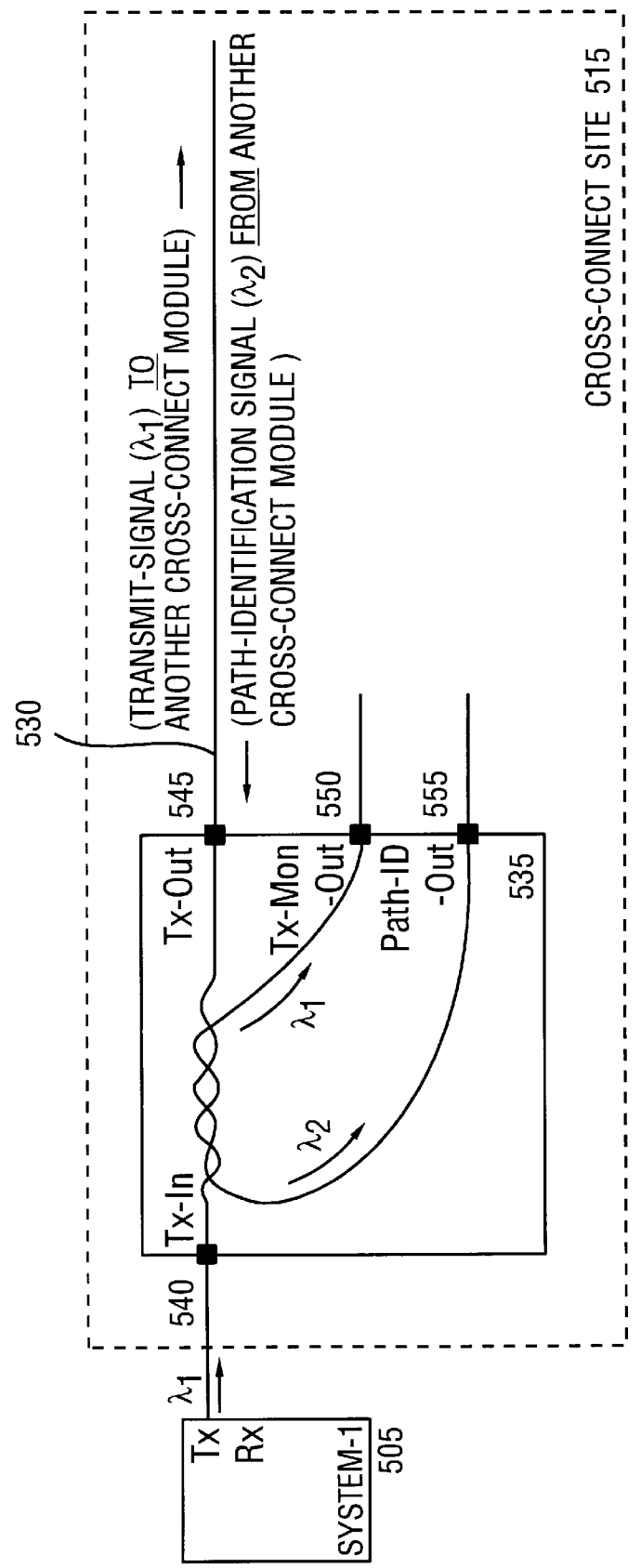
FIG. 6 illustrates one embodiment of a four-port fused biconic taper (FBT) type wavelength division multiplexing (WDM) filter for use in an optical cross-connect module in accordance with the invention.

Referring to FIGS. 5 and 6; if a path identification signal having wavelength $\lambda_2$ is injected into cross-connect module's 525 Path-ID-In/Rx-Mon-Out 5100 port, substantially all of the signal is coupled (via filter 590, identical to filter 560) to that module's Rx-In 5105 port and then routed, via patch cable 530, to cross-connect module 520's Tx-Out 545 port. Filter 535 couples substantially all of the path identification signal received at its Tx-Out 545 port to its Path-ID-Out 555 port. The connection between the two cross-connect modules can then be monitored by detecting the path identification signal at the Path-ID-Out port 555.

To permit visual identification, wavelength $\lambda_2$ should be chosen such that it is in the human visual range; between approximately 400 nm and 700 nm. An exemplary wavelength that is easily seen by most humans is 670 nm. To facilitate path identification, a pulsed or modulated source can be used to generate the path-identification signal. The large spectral separation between a path identification signal having a visual wavelength and a communication network's information signals (typically in the 1310 and 1550 nm windows), make the filter 535 (and filter 585) relatively simple and inexpensive to manufacture, although care must be taken to insure that the path identification signal does not interfere with the information signal at the optical detector in a distant site's receiver (i.e., system-1 505). This can be accomplished by using WDM filters 535, 560 with very high isolation values or by using lower isolation WDM filters but configuring the optical circuit so that any interfering (visual wavelength) light that leaves the cross-connect site 515 arrives at the distant site's (e.g., system-1 505) transmitter rather than its receiver. Since many commercial optical transmitters incorporating laser sources use an optical isolator, there is extra protection against interference at the transmitter versus the receiver.

As described above, in one embodiment filter 535 is implemented by a four-port FBT filter. This filter must be designed to couple substantially all of the path identification signal from the Tx-Out port 545 to the Path-ID-Out port 555, while coupling as little of the path identification signal's power as possible to the filter's Tx-In port 540. In an ideal design, 100% of the path identification signal's power arriving at the cross-connect module's Tx-Out port 545 would be coupled/routed to the Path-ID-Out port 555.

[8] The second filter 560 can also be implemented by, for example, a WDM filter manufactured via FBT or thin film technology. Alternatively, the filter can be embodied as a combination of one or more couplers and one or more three-port devices. (See discussion below for additional details on alternative embodiments.) If the second filter 560 is implemented using four-port techniques, it is advantageous to terminate the fourth, unused port 565, to prevent signal degradation caused by reflections.

[9] A transmit-signal from system-2 510 is received at a second cross-connect module's 525 transmit-signal input (Tx-In) port 5110, coupled through a first filter 585 (identical in operation to filter 535) to its Tx-Out port 5115 and routed via fiber optic jumper 530 to a first cross-connect module's 520 Rx-In port 570. For discussion purposes, this signal is hereinafter referred to as the receive-signal. (The signal is being routed from system-2's transmitter, to which the second cross-connect module 525 is connected, to system-1's receiver, to which the first cross-connect module 520 is connected; thus, the signal represents a "receive-signal" with respect to system-1.)

[10] A portion of the receive-signal, received at the filter's 560 Rx-In port 570 is routed to this port. See the discussion below for further details.

[11] The dual function path identification/receive-signal monitor output (Path-ID-In/Rx-Mon-Out) port 580 provides a convenient location to (1) inject a path identification signal and (2) measure the receive-signal's characteristics (e.g., power and waveform). Both of these operations are identical, in concept, to their transmit path analogues— transmit-path identification and transmit monitor functions described above. See the discussion below for further details.

[12] Operation of the second filter 560 is analogous to that of the first filter 535. For example, let system-2 510 transmit on a wavelength $\lambda_3$ (e.g., a wavelength in the 1550 nm or 1310 nm windows). This signal is routed through a cross-connect module 525 as discussed above; the cross-connected signal arriving at the Rx-In port 570 of cross-connect module 520. In one embodiment, coupling between the Rx-In port 570 to the Rx-Out port 575 is effected by a four-port FBT type filter. See FIG. 7. The FBT filter is designed to route the incoming receive-signal (having a wavelength $\lambda_3$) so that a portion of the signal's power is routed to the Rx-Out port 575 and the remainder of the signal's power is routed to the Path-ID-In/Rx-Mon-Out port 580.

As with the first filter 535, any splitting ratio between the Rx-In port 570 and the Rx-Out port 575 and the Path-ID-In/Rx-Mon-Out port 580 may be selected for monitoring purposes. The choice of a 50/50 ratio is advantageous because it allows a technician to determine the receive-signal's power directly by measuring the signal strength at the Path-ID-In/Rx-Mon-Out port 580; a 50/50 split ensures that the incoming receive-signal's power is evenly divided between the receive-signal output port and the receive-path-identification/monitor port. Any other splitting ratio requires a calculation to adjust the measured signal power to compensate for the splitting ratio of the filter 560.

Operation of the second filter 560 vis a vis visual path identification is, essentially, the same as for the first filter 535. See FIGS. 5 and 7. That is, a path identification signal having a wavelength $\lambda_4$ is injected, by a technician, at the Path-ID-In/Rx-Mon-Out port 580. Substantially all of this signal is routed by filter 560 to its Rx-In port 570, and is coupled via an optical fiber jumper 530 to another cross-connect module's (525) first filter (585) which routes the path identification signal to its Path-ID-Out port (5120). If the selected wavelength $\lambda_4$ is in the human visual range, the connection between the two cross-connect modules is evidenced by a visual glow. In one embodiment, an opaque connector cover can be placed over the Path-ID-Out port 5120 to difuse the visual light, thereby making it safer and easier to see.

[13] FIG. 8 shows and specifies an illustrative four-port WDM filter suitable for use in one embodiment of the invention suitable for use in a system using 1310 nm data signals and a 670 nm visual path identification signal. In such an embodiment, both filters within a cross-connect module 520 could utilize the same filter design. Second filter 560 would have its Port 2 (Transmit) port terminated to substantially eliminate reflection of optical signals. Cross-connect modules 520 and 525 are operationally equivalent.

5.3. Some Alternative Embodiments

Figure 7:
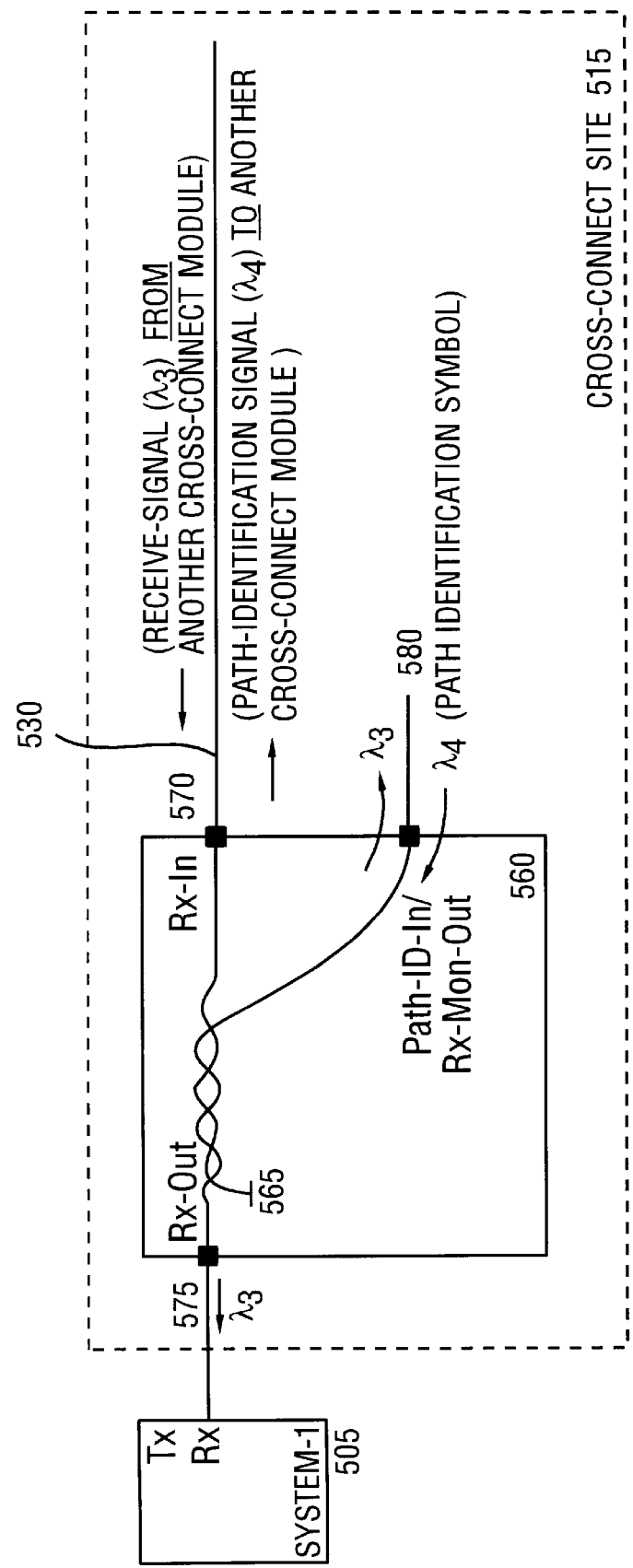
FIG. 7 illustrates one embodiment of a four-port fused biconic taper (FBT) type wavelength division multiplexing (WDM) filter having one of its ports terminated for use in an optical cross-connect module in accordance with the invention.

Many alternative embodiments of the above described cross-connect module are possible. For instance, instead of using two FBT type WDM filters, thin film WDM filters could be used. Further, one FBT and one thin film interference filter filter could be used. One possible embodiment using four-port thin film interference filters only is shown in FIG. 9. In this embodiment filter 535 is implemented using a thin film interference filter 900 rather than a FBT filter as shown in FIG. 6. Similarly, filter 560 is implemented using a thin film interference filter 905 rather than a FBT filter as shown in FIG. 7. All ports are numbered as shown in FIGS. 5, 6, and 7 for easy cross reference. Further, in one embodiment, communication wavelengths $\lambda_1$ and $\lambda_3$ are either in the 1310 nm or the 1550 nm window and $\lambda_2$ and $\lambda_4$ are approximately 670 nm.

An embodiment that provides both monitoring and visual path identification without using four-port devices is shown in FIG. 10. As shown, full functionality can be obtained by combining a coupler and a conventional three-port WDM to construct a four-port device. For instance, coupler 1000 and three-port WDM 1005 are combined to provide the functionality of a four-port WDM ala filter 535 of FIGS. 6 and 9. Similarly, coupler 1010 and three-port WDM 1015 are combined to provide the functionality of a three-port device ala filter 560 of FIGS. 7 and 9. In this embodiment, filter 560 is a four-port element having a separate path-signal identification input (Path-ID-In) port 1020 and a separate receive-signal monitor output (Rx-Mon-Out) port 1025. (In an embodiment using four-port devices such as those shown in FIGS. 5, 7, and 9, these functions are provided at a common port; port 580. Operationally, the embodiment of FIG. 10 is the same as that of FIG. 5.

5.4. Remarks

Those of ordinary skill having the benefit of this disclosure will appreciate that the invention provides a number of advantages. For example, optical cross-connect modules in accordance with the invention are completely passive and, therefore, do not require any external power. As a consequence, the inventive cross-connect module can provide dramatically improved reliability and reduced operational costs over electrical cross-connects. Additionally, the invention's visual path identification uses the identical signal path as the monitored information/communications' signals. (This is in contrast to electrical cross-connect modules in which path identification is provided via electrical tracer leads imbedded into coaxial cables and red LED indicators on the cross-connect modules.) Further, the inventive cross-connect module provides these benefits while maintaining the implementation of industry standard 1×1 protection capability.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An optical cross-connect module comprising:
   (a) a first filter having
   (i) a transmit-signal input (Tx-In) port,
   (ii) a transmit-signal output (Tx-Out) port,
   (iii) a transmit monitor output (Tx-Mon-Out) port,
   (iv) a path identification output (Path-ID-Out) port,
   (v) wherein said Tx-In port is optically coupled to the Tx-Out port and to the Tx-Mon-Out port at a first wavelength, and
   (vi) wherein said Tx-Out port is optically coupled to the Path-ID-Out port at a second wavelength; and
   (b) a second filter having
   (i) a receive-signal input (Rx-In) port,
   (ii) a receive-signal output (Rx-Out) port,
   (iii) a path identification input/receive-signal monitor output (Path-ID-In/Rx-Mon-Out) port,
   (iv) wherein said Rx-In port is optically coupled to the Rx-Out port and to the Path-ID-In/Rx-Mon-Out port at a third wavelength, and
   (v) wherein said Path-ID-In/Rx-Mon-Out port is optically coupled to the Rx-In port at a fourth wavelength.

2. The optical cross-connect module of claim 1, wherein said first filter is a four-port wavelength division multiplexing filter.

3. The optical cross-connect module of claim 2, wherein said four-port wavelength division multiplexing filter is a fused biconic taper filter.

4. The optical cross-connect module of claim 2, wherein said four-port wavelength division multiplexing filter is a thin film interference filter.

5. The optical cross-connect module of claim 1, wherein said second filter is a four-port wavelength division multiplexing filter having one port optically terminated.

6. The optical cross-connect module of claim 5, wherein said four-port wavelength division multiplexing filter is a fused biconic taper filter.

7. The optical cross-connect module of claim 5, wherein said four-port wavelength division multiplexing filter is a thin film interference filter.

8. The optical cross-connect module of claim 1 wherein at least one of said first and said third wavelengths is between approximately 1290 nanometers and approximately 1330 nanometers.

9. The optical cross-connect module of claim 1 wherein at least one of said first and said third wavelengths is between approximately 1525 nanometers and approximately 1575 nanometers.

10. The optical cross-connect module of claim 1 wherein at least one of said second and said fourth wavelengths is between approximately 400 nanometers and approximately 700 nanometers.

11. The optical cross-connect module of claim 1 wherein said first filter upon receiving a signal having said first wavelength, optically couples approximately 50% of the signal input to said transmit-signal input port to said transmit-signal output port and approximately 50% of said signal input to the transmit-signal input port to the transmit monitor output port.

12. The optical cross-connect module of claim 11 wherein said first wavelength is between approximately 1290 nanometers and approximately 1330 nanometers.

13. The optical cross-connect module of claim 11 wherein said first wavelength is between approximately 1525 nanometers and approximately 1575 nanometers.

14. The optical cross-connect module of claim 1 wherein said first filter, upon receiving a signal having the second wavelength, optically couples substantially all of the signal input to said transmit-signal output port to the path identification output port.

15. The optical cross-connect module of claim 14 wherein said second wavelength is between approximately 400 nanometers and approximately 700 nanometers.

16. The optical cross-connect module of claim 1 wherein said second filter, upon receiving a signal having said third wavelength, optically couples approximately 50% of the signal input to said receive-signal input port to the receive-signal output port and approximately 50% of said signal input to the receive-signal input port to the path identification input/receive-signal monitor output port.

17. The optical cross-connect module of claim 16 wherein said third wavelength is between approximately 1290 nanometers and approximately 1330 nanometers.

18. The optical cross-connect module of claim 16 wherein said third wavelength is between approximately 1525 nanometers and approximately 1575 nanometers.

19. The optical cross-connect module of claim 1 wherein said second filter optically, upon receiving a signal having said fourth wavelength, couples substantially all of the signal input to said receive-signal input port to the path identification input/receive-signal output port.

20. The optical cross-connect module of claim 19 wherein said fourth wavelength is between approximately 400 nanometers and approximately 700 nanometers.

21. An optical cross-connect module comprising:
(a) a first four-port wavelength division multiplexing filter having
  (i) a transmit-signal input (Tx-In) port,
  (ii) a transmit-signal output (Tx-Out) port,
  (iii) a transmit monitor output (Tx-Mon-Out) port,
  (iv) a path identification output (Path-ID-Out) port,
  (v) wherein said first four-port filter, upon receiving a first signal having a first wavelength, optically couples the first signal input to said Tx-In port to the Tx-Out port and to the Tx-Mon-Out port, and
  (vi) wherein said first four-port filter, upon receiving a second signal having a second wavelength, optically couples substantially all of the second signal input to the Tx-Out port to the Path-ID-Out port; and
(b) a second four-port filter having
  (i) a receive-signal input (Rx-In) port,
  (ii) a receive-signal output (Rx-Out) port,
  (iii) a path identification input/receive-signal monitor output (Path-ID-In/Rx-Mon-Out) port,
  (iv) an optically terminated port,
  (v) wherein said second four-port filter, upon receiving a third signal having a third wavelength, optically couples the third signal input to said Rx-In port to the Rx-Out port and to the path-ID-In/Rx-Mon-Out port, and
  (vi) wherein said second four-port filter, upon receiving a fourth signal having a fourth wavelength, optically couples substantially all of the fourth signal input to said Path-ID-In/Rx-Mon-Out port to the Rx-In port.

22. The optical cross-connect module of claim 21 wherein at least one of said first and said third wavelengths is between approximately 1290 nanometers and approximately 1330 nanometers.

23. The optical cross-connect module of claim 21 wherein at least one of said first and said third wavelengths is between approximately 1525 nanometers and approximately 1575 nanometers.

24. The optical cross-connect module of claim 21 wherein at least one of said second and said fourth wavelengths is between approximately 400 nanometers and approximately 700 nanometers.

25. The optical cross-connect module of claim 21 wherein said first four-port wavelength division multiplexing filter is a fused biconic filter.

26. The optical cross-connect module of claim 21 wherein said first four-port wavelength division multiplexing filter is a thin film interference filter.

27. The optical cross-connect module of claim 21 wherein said second four-port wavelength division multiplexing filter is a fused biconic filter.

28. The optical cross-connect module of claim 21 wherein said second four-port wavelength division multiplexing filter is a thin film interference filter.

29. The optical cross-connect module of claim 21 wherein said first four-port filter optically couples approximately 50% of the first signal input to said transmit-signal input port to the transmit-signal output port and approximately 50% of said first signal input to the transmit-signal input port to the transmit monitor output port.

30. The optical cross-connect module of claim 29 wherein said first wavelength is between approximately 1290 nanometers and approximately 1330 nanometers.

31. The optical cross-connect module of claim 29 wherein said first wavelength is between approximately 1525 nanometers and approximately 1575 nanometers.

32. The optical cross-connect module of claim 21 wherein said second four-port filter optically couples approximately 50% of the third signal input to said receive-signal input port to the receive-signal output port and approximately 50% of said third signal input to the receive-signal input port to the path identification input/receive-signal monitor output port.

33. The optical cross-connect module of claim 32 wherein said third wavelength is between approximately 1290 nanometers and approximately 1330 nanometers.

34. The optical cross-connect module of claim 32 wherein said third wavelength is between approximately 1525 nanometers and approximately 1575 nanometers.

35. An optical cross-connect module comprising:
(a) a first filter having
  (i) a transmit-signal input (Tx-In) port,
  (ii) a transmit-signal output (Tx-Out) port,
  (iii) a transmit monitor output (Tx-Mon-Out) port,
  (iv) a transmit path identification output (Path-ID-Out) port,
  (v) wherein said Tx-In port is optically coupled to the Tx-Out port and to the Tx-Mon-Out port at a first wavelength, and (vi) wherein said Tx-Out port is optically coupled to the Path-ID-Out port at a second wavelength; and (b) a second filter having
(i) a receive-signal input (Rx-In) port,
(ii) a receive-signal output (Rx-Out) port,
(iii) a path-signal identification input (Path-ID-In) port,
(iv) a receive-signal monitor output (Rx-Mon-Out) port,
(v) wherein said Rx-In port is optically coupled to the Rx-Out port and to the Rx-Mon-Out port at a third wavelength, and
(vi) wherein said Path-ID-In port is optically coupled to the Path-In port at a fourth wavelength.

36. The optical cross-connect module of claim 35, wherein said first filter comprises:
a three-port coupler operatively coupling the Tx-In port to said Tx-Mon-Out port; and
a three-port wavelength division multiplexer filter operatively coupling said Tx-In port to said Tx-Out port via said three-port coupler and operatively coupling said Tx-Out port to said Path-Id-Out port.

37. The optical cross-connect module of claim 35, wherein said second filter comprises:
a three-port coupler; and
a three-port wavelength division multiplexer filter, the three-port coupler coupling said Rx-In port to said Rx-Mon-Out port and to said Rx-Out port via said three-port wavelength division multiplexer filter.

38. The optical cross-connect module of claim 35 wherein at least one of said first and said third wavelengths is between approximately 1290 nanometers and approximately 1330 nanometers.

39. The optical cross-connect module of claim 35 wherein at least one of said first and said third wavelengths is between approximately 1525 nanometers and approximately 1575 nanometers.

40. The optical cross-connect module of claim 35 wherein at least one of said second and said fourth wavelengths is between approximately 400 nanometers and approximately 700 nanometers.

41. The optical cross-connect module of claim 35 wherein said first filter, upon receiving a signal having said first wavelength, optically couples approximately 50% of the signal input to said transmit-signal input port to the transmit-signal output port and approximately 50% of said signal input to the transmit-signal input port to the transmit monitor output port.

42. The optical cross-connect module of claim 41 wherein said first wavelength is between approximately 1290 nanometers and approximately 1330 nanometers.

43. The optical cross-connect module of claim 41 wherein said first wavelength is between approximately 1525 nanometers and approximately 1575 nanometers.

44. The optical cross-connect module of claim 35 wherein said first filter, upon receiving a signal having said second wavelength, optically couples substantially all of the signal input to said transmit-signal output port to the path identification output port.

45. The optical cross-connect module of claim 44 wherein said second wavelength is between approximately 400 nanometers and approximately 700 nanometers.

46. The optical cross-connect module of claim 35 wherein said second filter, upon receiving a signal having said third wavelength, optically couples approximately 50% of the signal input to said receive-signal input port to the receive-signal output port and approximately 50% of said signal input to the receive-signal input port to the receive-signal monitor output port.

47. The optical cross-connect module of claim 46 wherein said third wavelength is between approximately 1290 nanometers and approximately 1330 nanometers.

48. The optical cross-connect module of claim 46 wherein said third wavelength is between approximately 1525 anometers and approximately 1575 nanometers.

49. The optical cross-connect module of claim 35 wherein said second filter, upon receiving a signal having said fourth wavelength, optically couples substantially all of the signal input to said receive-signal input port to the path-signal identification input port.

50. The optical cross-connect module of claim 49 wherein said second filter optically couples substantially all of a signal having said fourth wavelength is between approximately 400 nanometers and approximately 700 nanometers.

51. An optical communication central switching office comprising one or more optical cross-connect modules for cross-connecting optical communications signals in accordance with any one of claims 1 through 50.

* * * * *